United States Patent [19]

Carew et al.

[11] 3,955,073

[45] May 4, 1976

[54] CALIPER TYPE DIMENSIONAL SENSING DEVICES AND ASSOCIATED ELECTRONIC MENSURATION, DATA PROCESSING AND PRINTOUT SYSTEM

[76] Inventors: Victor E. Carew; Victor E. Carew, Jr, both of 610 W. Taylor Run Parkway, Alexandria, Va. 22314

[22] Filed: May 14, 1974

[21] Appl. No.: 469,770

[52] U.S. Cl. ............... 235/151.32; 235/151.33; 33/1 V
[51] Int. Cl.² ............................................. G01B 7/00
[58] Field of Search..... 235/151.32, 92 MT, 151.33; 73/149; 33/1 V; 340/172.5

[56] References Cited
UNITED STATES PATENTS

| | | | |
|---|---|---|---|
| 2,727,391 | 12/1955 | Kolisch | 235/151.33 X |
| 3,588,480 | 6/1971 | Unger et al. | 235/151.33 X |
| 3,635,297 | 1/1972 | Salava | 235/151.33 X |
| 3,725,656 | 4/1973 | Fukuma | 235/151.33 |

Primary Examiner—Edward J. Wise

[57] ABSTRACT

A method and system for using caliper-type dimensional sensing devices of the present invention that utilize sensors to interpret linear dimensional values of objects being measured and electric circuit control switches to transmit such values to an interfacing standard electronic printing calculator of known design for mensuration or other data processing and label printout of such values at the calculator. The electrical control circuits of each dimensional sensing device are wired in parallel with the keyboard of the printing calculator thus allowing the sensing device to function as a remote keyboard of the calculator, or alternately, of a programmable electronic calculator or computer with associated printout and/or other data processing or output devices.

27 Claims, 10 Drawing Figures

3,955,073

CALIPER TYPE DIMENSIONAL SENSING DEVICES AND ASSOCIATED ELECTRONIC MENSURATION, DATA PROCESSING AND PRINTOUT SYSTEM

BACKGROUND OF THE INVENTION

The present invention relates to dimensional measurement and related mensuration and data processing systems and more particularly to a measurement system employing a dimensional sensing device capable of automatically registering the "sensed" value of the measured distance between two points in an electronic printing calculator, or alternately, in a programmable calculator or computer. By registering two or more dimensional values of a given pair of measurements, using one or more of the disclosed dimensional sensing devices, inputs to the calculator or computer can be sequenced or programmed to provide for automatic mensuration (computation of surface areas or cubic volumes) or other data processing related to the dimensional values so registered. Other data such as weight, determined by weigh scales of known design, can be manually or automatically registered in the calculator or computer; integrated data may be used to develop densities, optimum shipping lots, etc. Production, warehousing and transportation planning can also be greatly enhanced by use of such data; parcel post and transportation rates can also be determined and the optimum mode of transportation can thereby be selected.

Control switches on the dimensional sensing devices can cause printing calculators or programmable calculators/computers with associated printout devices to print dimensional, cube, weight and other data on gummed-backed or pressure-sensitive backed label printout tapes or other printout documents. Punched tapes, punched cards, and magnetic tapes are also representative of output capabilities of such integrated systems.

Various methods, devices and systems related to these purposes are in use today. The simplest device is a measuring ruler or tape; measurements are manually taken and posted and entered into a calculator to determine surface areas or volumes of objects.

Another method for determining cubic volume is to use a "cube book" which has one dimension of a rectangular prism (such as a box or carton) on one page of the book with the second and third dimensions furnished as columnar headings and line designators; cube values are given at the point of intersection of any column with any particular line.

These methods are very time consuming and subject to error.

Another device for determining cubic volume consists of two rectangular plates positioned at right angles to one another; these plates have hyperbolic curves printed or inscribed upon them. The plates are mounted in vertical planes and a carton whose cubic volume is to be determined is placed at their base in contact with their vertical faces. The volume of the carton may be "read" by following certain procedures relating to intersecting points of the hyperbolic curves on the plates and "reading" the cubic volume of the carton from values given such intersecting points. This method is less time consuming than the prior described methods but is relatively slow when compared with the measurement sensing devices and methods disclosed. It lacks the ability to automatically print-out labels and other documents or to automatically integrate dimensional/volume data with other data and provides for automatic analysis and standard automatic data processing outputs thereof.

Still another device for measuring cubic volume uses three variable resistors mounted at right angles to one another in a manner that allows one to measure the height, a second to measure the width and a third to measure the length. In each case, the base of the resistor is aligned with one edge of the carton and the sliding (variable) contact is set at the opposite edge of the carton. The electrical resistance of each resistor is mathematically proportional to the logarithm of the respective carton dimension. A series of electrical and mechanical linkages results in allowing the operator of the device to "read" the volume and postal rate for the carton directly from a scale printed on a cylindrical drum that rotates through a "readout" window. This device is slightly slower than the prior device described above but does include the end product not only the volume of the carton, but its postal rate. However, when compared with the device and method disclosed herein, this device has the same shortcomings described for the prior device.

In recent years, light-sensitive sensors and closed circuit television grids have been used to view/record the profile of cartons and other objects moving on conveyors. Such devices have been interfaced with analog computers which are capable of processing data and furnishing data outputs equal to those of the disclosed invention. However, the cost of such equipment is extremely high compared with the cost of the disclosed invention. This is particularly true when a system with a minimum output capability is required. One advantage of the light-sensing analog computer system is that the true surface area or cube of irregular objects can be determined swiftly and effectively. The disclosed invention can swiftly and effectively determine the surface area or cube of rectangular prisms and other regular geometric shapes but is not able to effectively and swiftly determine the surface area or cube of some non-geometric irregular shapes. This is not a problem when only regular shapes are to be measured; in this case, the simpler, less expensive aspects of the disclosed invention prove to be an advantage over the more expensive systems that are actually over-designed for use in measuring regular objects.

SUMMARY OF THE INVENTION

The present invention overcomes disadvantages and accommodates advantages described above by employing an electronic measuring system that includes caliper-type linear dimension measuring devices with measurement sensing and electrical switching capability that functions as a remote entry station to a keyboard of a standard printing calculator; or alternately, to a programmable calculator or computer with associated printout and other collateral equipment. The measuring devices can accommodate measuring the distance between two points by manually or automatically setting the caliper jaws to properly interface with such points, the distance between which is to be measured.

Several of the preferred embodiments consist of an L-shaped member, the short leg of which functions as a sliding jaw while the long leg or shank of the "L" contains sensor actuators and slides through a "tunnel" in a control module that contains circuit control switches, sensors and a caliper jaw that matches the jaw on the L-shaped member. The "whole number" value of the distance between such matching caliper jaws is "sensed" by the interaction of the sensor actuators on the shank of the L-shaped member and the sensors in the control module. On several of the preferred embodiments a "decimal plunger jaw" protruding from the face of the caliper jaw appended to the control module is used to "sense" the decimal number portion of the length being measured. Such "sensing" is actually a method by which the numeric value of the dimension being sensed is expressed in terms of the closing of electrical circuits representative of such value by the interaction of sensor actuators and associated sensors.

Circuit control switches at the control module are operated manually or automatically to transmit electrical impulses to the keyboard of the interfacing calculator or computer to register the magnitude of the measurement.

Alternate methods provide for measurements without the use of the decimal plunger jaw or use coded signals with a decoder placed in the electrical circuit between the sensing device and the calculator or computer.

Another alternate method uses a device similar to that described above without the decimal plunger wherein sensor actuators are deleted from the shank of the L-shaped member and a transmitter located in the control module beams a wave frequency at a retroreflector mounted on the sliding jaw and a receiver, also located in the control module, receives such reflected waves or "echoes" from the retroreflector. A wave length/frequency signal and time delay interpreter/coder is used to register the volume of the distance being measured in the keyboard of the interfacing calculator or computer via a decoder located in the circuit between the interpretor/coder and the calculator or computer.

Other variations utilizing known types of mechanical, thermal, electrical, acoustical, chemical, optical and other sensors may also be utilized to sense dimensional values using the principle of a caliper measurement sensing device capable of sensing dimensional values and registering such values in an interfacing calculator or computer. Subsequently, such registered data are integrated with other data, displayed, and/or printed on perforated gummed-backed labels and/or other documents; such data may also be stored in memory units for shipment planning, production planning, inventory control, etc. and can also be processed for other uses on magnetic tapes, punched cards, magnetic drums, etc.

Two or more linear dimensional measurements with one or more of these caliper type sensing devices may consecutively or concurrently be taken and sensed information can be transmitted to the parent keyboard for processing as described above. Such multiple mesurements may be programmed for mensuration of data, thus reflecting dimensions, surface areas, cubic volumes, etc. Mensuration data thus obtained can be integrated with weight data obtained by weighing objects so measured; depending on type of weighing equipment used, such weight data may be automatically transmitted from the weighing equipment to the electronic data processing equipment being used or it may be entered into such data processing equipment via manual keyboard entry. When both weight and cubic volume data pertaining to an object to be mailed or shipped are available, data processing equipment may be used for comparison of such data with postal and freight rates to determine applicable rates and optimum modes for movement of material involved. The resultant data printouts of labels and/or documents may include information relating to dimensions, surface areas, cubic volumes, weights, densities, centers of gravity of shipping lots (e.g. aircraft loading) and/or postal or freight rates.

Manual versions of the measuring device include use of a single hand-held "wand" device or, alternately, a set of three such devices mounted at right angles to one another on either a work table or non-powered conveyor may be used in order to get three relatively fast "readings" on a rectangular prism such as a carton or box; full automation can be achieved by refining this latter method through use of a skewed powered conveyor complete with object or carton sensors, automatic stops, etc. that actuate caliper jaw opening and closing mechanisms, automatic weighing scales, etc.

An object of the current invention is to provide an inexpensive caliper-type dimensional sensing device that will simply and instantaneously register values of sensed dimensions in a standard electronic printing calculator for subsequent controlled mensuration computation and label printout of linear dimensions, areas and volumes of regular geometric shapes and objects.

It is another object of this invention to provide a device capable of being used with an additional one or two identical device(s) to accelerate and/or automate dimensional sensing and accomplish the results of the prior object.

A further object of this invention is to provide a device capable of being utilized on a powered production, receiving, packing, shipping or cargo handing conveyor line and automatically calculating/registering/printing linear dimensions, areas or volumes of products, containers, packages, cartons, pallet loads of material, etc.

Another object of this invention is the provision of a dimensional sensing device and related electronic mensuration system capable of being interfaced with other electronic data inputs, such as weight data from an electronic weigh scale of known design, and other electronic data input, storage and output equipment including teletypewriters,, high speed printers, computers, card and tape data processors, etc.

It is yet a further object of this invention to use dimensional, weight and cube data obtained through application of the devices disclosed herein to provide for the planning, scheduling and utilization of transportation, warehousing and other distribution facilities as well as for purposes relating to a multitude of other commercial, industrial and governmental applications.

Other objects, advantages and novel features of the present invention will become apparent from the following detailed description of the invention when considered in conjunction with the accompanying drawings.

DESCRIPTION OF THE PREFERRED EMBODIMENTS

Figure 1:
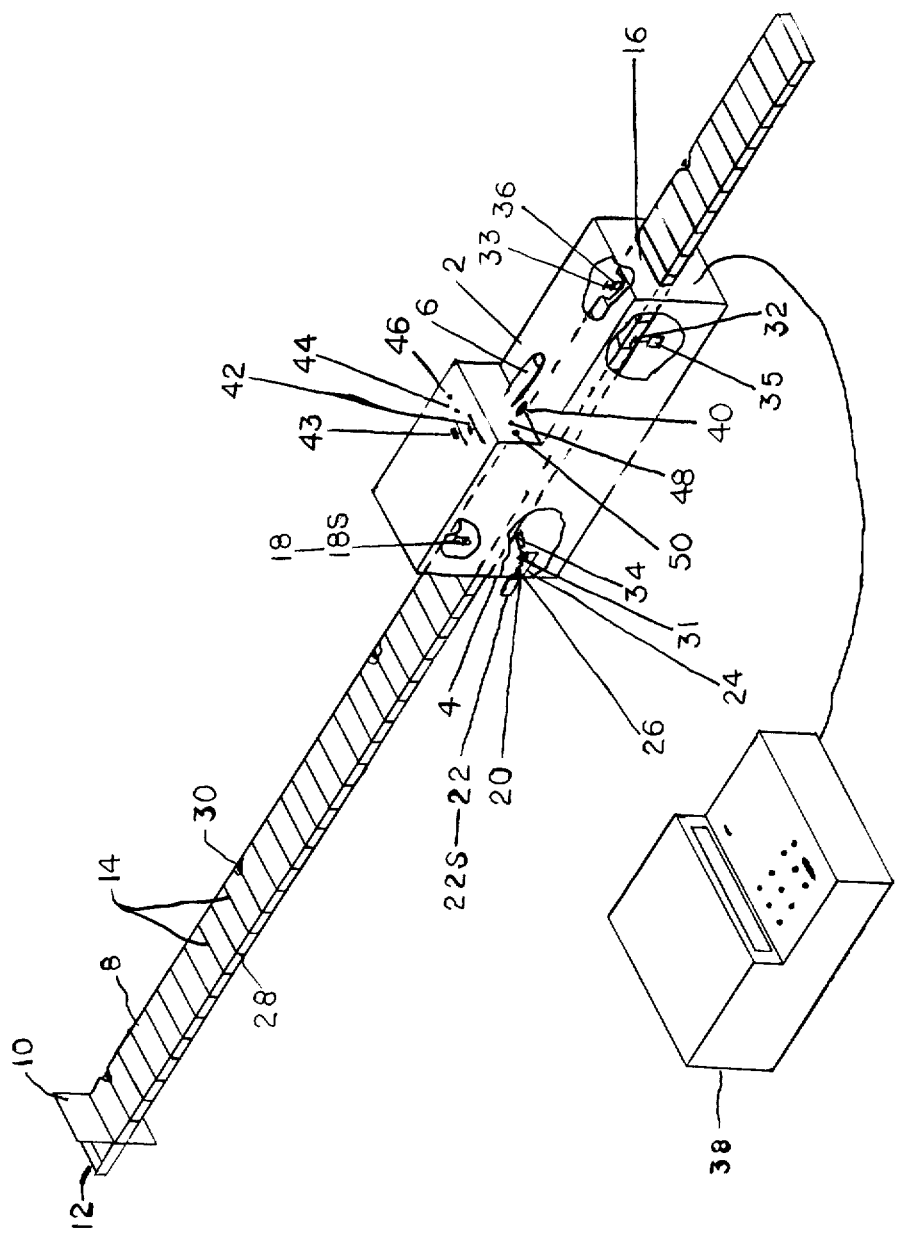
FIG. 1 is a view in perspective of one possible design of a manually operated automatic sensing caliper-type dimension measuring device interfacing with a standard printing calculator that performs mensuration computations and provides label printouts.
Figure 2:
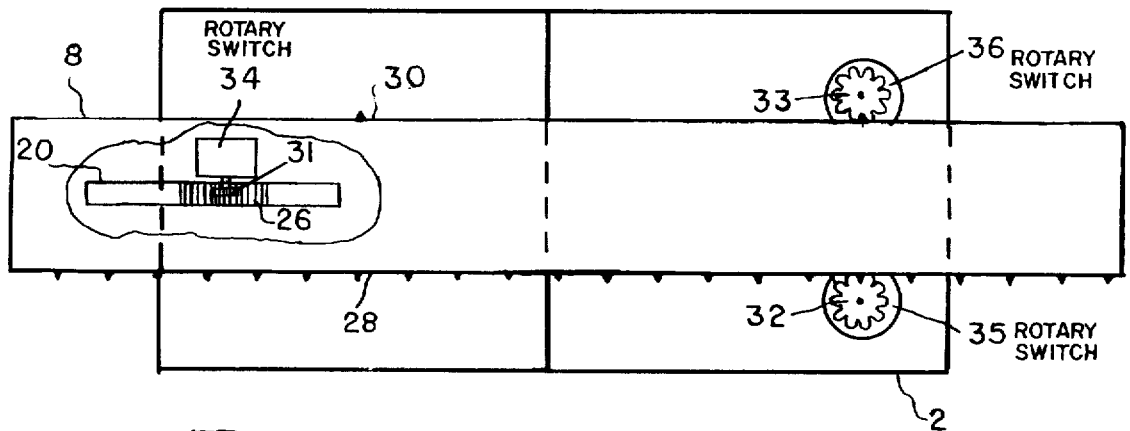
FIG. 2 is a plan/break-a-way view that illustrates interfacing relationships of measurement sensing components located within the control module of FIG. 1.

FIGS. 1 and 2 illustrate one design for a manually operated, automatic sensing, caliper-type dimension measuring and mensuration device of the present invention. The sensing device includes a control module 2 with appended sliding jaw face 4 and control handle 6 that slides on an L-shaped whole number sensor bar 8 with appended locating jaw face 10 and jaw handle 12. Caliper-type jaw faces 4 and 10 are flat and match each other in size and shape; when "closed" or touching, they lie in the same geometric plane which is perpendicular to the long imaginary center-line of the whole number bar 8. The whole number sensor bar 8 is of regular cross-section and contains indexing slots 14 located along the length of its surface at intervals of 1.00 inches or centimeters (depending on the measurement system used). A slide tunnel 16, within the control module 2, snugly embraces and makes sliding contact with the bottom and sides of the whole number sensor bar 8. A spring-loaded indexing ball catch 18 mounted in the roof of the slide tunnel 16 engages/disengages, during sliding contact, the indexing slots 14 on the whole number sensor bar 8. Indexing slots 14 are identified as 14-0, 14-1, 14-2, etc. with indexing slot 14-0 being the slot nearest the locating jaw face 10. Indexing slots 14 are calibrated so that when the indexing ball catch 18 is engaged with indexing slot 14-0, 14-1, or 14-2, etc. the perpendicular distance between caliper jaws 4 and 10 is +0.90, 1.90 or 2.90, etc. inches or centimeters, respectively.

A spring-loaded plunger-type decimal digit sensor bar 20 with appended plunger jaw face 22 is mounted in the sliding jaw face 4 and a plunger and spring housing 24 concealed within the control module 2. The decimal digit sensor bar 20 moves within its plunger and spring housing 24 along an imaginary line of travel that is perpendicular to sliding jaw face 4 and plunger jaw face 22. Under relatively weak spring-loading, the plunger jaw face 22 extends into the opening between caliper jaw faces 4 and 10 a distance of 0.90 inces or centimeters when caliper jaw faces 4 and 10 are separated by a distance equaling or exceeding that value. Pressure on the plunger jaw face 22 causes the decimal digit sensor bar 20 to recede into its plunger and spring housing 24 until the plunger jaw face 22 and sliding jaw face 4 are in the same geometric plane. Thus, when caliper jaw faces 4 and 10 are "closed" the three jaw faces 4, 10 and 22 are all in the same geometric plane.

A decimal digit gear rack 26 is mounted on the decimal sensor bar 20 (concealed within the control module 2) with its pitch line parallel to the direction of travel of the decimal digit sensor bar 20. The decimal digit gear rack 26 contains 10.0 gear teeth per inch or centimeter and comprises approximately 12 to 15 gear teeth.

A units digit gear rack 28 and a tens digit gear rack 30 are mounted along the length of the whole number sensor bar 8 with their pitch lines parallel to the direction of movement of the whole number sensor bar 8. The gear teeth on gear racks 28 and 30 are identical in size and shape to the gear teeth on gear rack 26. However, the pitch distance between gear teeth on the units digit gear rack 28 is 1.00 inches or centimeters and the pitch distance between gear teeth on the tens digit gear rack 30 is 10.00 inches or centimeters.

Each of the three gear racks 26, 28 and 30 interfaces with a ten-booth spur gear 31, 32 and 33, respectively, mounted on the shaft of a ten position electrical rotary switch 34, 35 and 36, respectively, at some convenient location within the control module 2. The centerline of each of these shafts is parallel to the geometric plane passing through sliding jaw face 4. Starting with the gear tooth nearest locating jaw face 10, the gear teeth on gear racks 28 and 30 are sequentially numbered 28-0, 28-1, 28-2, etc. and 30-0, 30-1, 30-2, etc., respectively, The units digit gear rack 28 is calibrated by causing gear tooth 28-0 to be centered between interfacing gear teeth on its associated spur gear 32 when the distance between caliper jaws 4 and 10 is equal to 1.4 inches or centimeters. Similarly, when the first tooth 30-0 on the tens digit gear rack 30 is centered between interfacing gear teeth on its associated spur gear 33, the distance between caliper jaw faces 4 and 10 is 11.4 inches or centimeters.

The number of gear teeth on gear racks 28 and 30 and the length of such gear racks and the whole number sensor bar 8 will vary and will be dependent upon the length of objects to be measured. When the number of teeth in gear racks 28 and 30 equals or exceeds 100 and 10 respectively, a hundreds digit gear rack 300 (not illustrated) will be required; it will have a pitch distance between teeth of 100 inches or centimeters and its first tooth 300-0 (not illustrated) will be centered between two interfacing teeth on its associated spur gear 301 (not illustrated) when the distance between caliper jaw faces 4 and 10 is equal to 101.4 inches or centimeters.

Spring-loaded electrical control switches of known design, located adjacent to the control handle 6, provide easy thumb and index finger control of electrical circuits that are wired in parallel with the underside of the keyboard of a standard electronic printing calculator 38; (e.g. Unitrex model 1600 or Royal Digital 12); see FIGS. 1 and 3. They include an "On-Off" toggle switch 40 operated by the index finger, and a 3 digit slide switch 42, a multiplication keyboard button 44, an addition keyboard button 46, an equals keyboard button 48 and a clear keyboard button 50 which are operated by the thumb. The spring-loaded "On-Off" toggle switch 40 is a normally open, single pole single thow switch that receives electrical current from the common terminal 38-C of the keyboard of the calculator 38 when power to the calculator 38 is turned on for its normal operation. Therefore, the terminal of the "On-Off" toggle switch that is wired to the common terminal of the calculator 38 is its input terminal and its other terminal is its output terminal. This output terminal is connected to one terminal on each of the normally open momentary contact push-button switches designated as multiplication, addition, equals, and clear keyboard buttons 44, 46, 48 and 50, respectively; the other terminal on each of these four push-button switches is wired directly to the non-common contact of the switch under the multiplication, addition, equals and clear keyboard buttons 38-M, 38-A, 38-E and 38-L of the calculator 38, respectively. The 3 digit slide switch 42 has four pairs of terminal contacts 42-1, 42-2, 42-3 and 42-4. Each of these pairs of contacts functions as a normally open single pole single throw switch; each is momentarily "closed" by the sliding contact as it slides through its groove from an "off" position at one end of its groove to another "off" position at the other end of its groove. The set of four contacts on one side of these four pairs of terminals in electrically shunted and connected to the input terminal of the "On-Off" toggle switch 40 from which it receives electrical current furnished by the common terminal 38-C of the calculator 38. The non-shunted contacts of terminals 42-1, 42-2 and 42-4 are wired to the common terminals on rotary switches 36, 35 and 34 respectively, associated with the tens digit gear rack 30, the units digit gear rack 28 and the decimal digit gear rack 26, respectively. The non-common contact point of terminal 42-3 is wired to the non-common contact under the "decimal" keyboard push-button 38-D on the calculator 38. The sliding contact on the 3 digit slide switch 42 is spring-loaded so that it is normally in the "off" position adjacent to terminal contacts 42-1.

Rotary switches 35 and 36 are each a single deck (wafer), shorted contact-type, ten position rotary switch with spring-loaded "snap" contact indexing action. Rotary switch 34 is identical to rotary switches 35 and 36 except that the indexing spring is removed. The common terminals 34-C, 35-C and 36-C are the input terminals for the rotary switches 34, 35 and 36, respectively. These terminals receive electrical current from the common terminal 38-C under the keyboard of the calculator 38 via the manually closed "On-Off" toggle switch 40 and the manually closed 3 digit slide switch 42. Current received at rotary switch terminals 34-C, 35-C and 36-C is passed through a rotary contact inside the rotary switches to one of the 10 stationary output contacts connected to output terminals 0 through 9; these 10 output terminals on each of the 3 rotary switches are each wired (in parallel) to their similarly designated numeric counterparts on the other two rotary switches and to the non-common contacts 38-0 through 38-9 of the push-button switches under their numeric counterparts (push-button numerals 0 through 9) on the keyboard of the calculator 38.

The spur gears 31, 32 and 33 and the rotary contacts inside rotary switches 34, 35 and 36, respectively, are each mounted on and concurrently turn with the shaft of the rotary switches 34, 35 and 36, respectively. Each of the 10 gear teeth on spur gears 31, 32 and 33 and each of the 10 stationary output terminal contacts located inside the rotary switches 34, 35 and 36 subtend an arc of 36° which is one-tenth of a complete revolution. Therefore, whenever one of the whole number gear racks 28 or 30 engages and disengages its associated spur gear 32 or 33, with proper calibration (and because of the "snap" indexing capability of rotary switches 35 and 36) both the spur gears 32 and 33 and the rotary contacts inside the rotary switches 35 and 36 rotate exactly 36° or one-tenth of a revolution. Thus, engagement and disengagement of any of the gear teeth on gear racks 28 or 30 with their associated spur gear 32 or 33 will cause the rotary contact inside rotary switch 35 and 36 to "switch" from having full contact with one of the 10 stationary output terminal contacts to having full contact with an adjacent output terminal contact.

When power to the calculator 38 is switched "on" from its normal operating source, and control switch 40 and contacts 42-2 on slide switch 42, for example, are both manually closed, a current will flow from the calculator through the rotary switch 35 via its output terminal (1 of 10) whose stationary output contact is in contact with the rotary contact inside the rotary switch 35; if such output terminal is 35-6, for example, electrical current will return to the calculator 38 via the contact switch 38-6 under its keyboard button "6". The result will be that the digit 6 will be electronically registered in the calculator 38 and displayed in its "monitor" window pending further processing.

When power flows through output terminal 35-6 of the rotary switch 35 associated with the units digit gear rack 28, their interfacing spur gear 32 will be straddled by gear teeth 28-5 and 28-6, or 28-15 and 28-16, or 28-25 and 28-26, etc. During normal measurement "sensing" operations disclosed hereunder, the indexing ball catch 18 would be engaged with indexing slot 14-6, 14-16 or 14-26, etc., when the digit 6 is registered in the calculator 38 as a result of "sensing" associated with the units digit gear rack 28 in consonance with the foregoing. During such specific engagement of the indexing ball catch 18 with indexing notch 14-6, 14-16 or 14-26, etc., the distance between the locating jaw face 10 and the plunger jaw face 22 will be equal to 6, 16 or 26, etc., inches or centimeters, respectively. If such distance is reduced by sliding the control module 2 toward the locating jaw face 10 until the indexing ball catch 18 engages the next indexing slot 14-5, 14-15 or 14-25, etc., respectively, the distance between jaw faces 10 and 22 will have been reduced to 5, 15 or 25, etc., inches or centimeters, respectively. At approximately the half-way joint of such jaw-closing movement of 1.0 inches or centimeters, the interfacing spur gear 32 and its associated rotary switch 35 will have been caused to rotate through an arc of 36° as the result of an engagement and disengagement with gear tooth 28-5, 28-15 or 28-25, etc. This engagement/disengagement causes, with proper prior calibration, contact within the rotary switch 35 to "switch" from output terminal contact 35-6 to output terminal contact 35-5. Therefore, when control switches 40 and 42 (terminal contacts 42-2) are "closed" the single digit 5 will be electronically registered and displayed in the calculator 38 pending further processing.

The foregoing description of measurement-sensing capability applicable to the units digit gear rack 28 is totally applicable to measurement-sensing capabilities of the tens digit gear rack 30 and its associated spur gear 33, rotary switch 36, and terminal contacts 42-1 on slide switch 42 except that sample numeric values assigned to indexing notches 14 and linear distances will be 10 times greater. For example, indexing notches 14-60 and 14-50 will apply rather than notches 14-6 and 14-5; and, applicable distances between jaw faces 10 and 22 will be 60 and 50 rather than 6 and 5 inches or centimeters, respectively.

The decimal digit gear rack 26, through its interfacing spur gear 31/modified rotary swtich 34 assembly and control switches 40 and 42 (contacts 42-4) causes single-digit registrations/displays in the calculator 38 in a manner similar to that described for the units digit gear rack 28 above. The spur gear 31 contains 10 teeth and has a pitch circumference of 1.00 inch or centimeter; it therefore contains 10.0 teeth per inch or centimeter. The decimal digit gear rack also contains 10.0 teeth per inch or centimeter. Since the decimal digit gear rack 26 is limited to a linear travel of 0.90 inches or centimeters, by the same limited and concurrent linear travel of the plunger jaw face 22, its interfacing spur gear 31 and associated rotating contact located inside modified rotary switch 34 will be limited to a maximum rotation of 0.90 revolutions. This equates to a revolution through 9 out of the 10 spaces between the 10 output terminal contacts on the rotary switch. The assembly thus described is calibrated and wired to the calculator 38 so that when the plunger jaw face 22 is moved from its fully protruding position to its fully retracted position (wherein it is located in the plane of the sliding jaw face 4) the calculator 38 will register and display digital values ranging from "0" (extended value) to "9" (retracted value), respectively. Since the modified rotary switch 34 does not have an "indexing spring" linear motion of the plunger jaw face 22 and rotary motion of its associated assembly is relatively smooth, sensitive and friction free.

In consideration of the foregoing, if the length of an object, such as a carton, is to be determined, the caliper jaw faces 4 and 10 are manually separated so that their opening exceeds the length of the carton by 2 or 3 inches or centimeters. The locating jaw face 10 is placed against one end of the carton and the control module 2 is slid slowly toward the carton until the plunger jaw face 22 contacts the other end of the carton an the indexing ball catch 18 engages an indexing slot 14 concurrent with or immediately subsequent to such carton contact by the plunger jaw face 22; if engagement of an indexing slot 14 by the indexing ball catch 18 does not occur at the instant the plunger jaw face 22 contacts the carton, such engagement will occur sometime during continued retraction of the decimal plunger 20 into its plunger and spring housing 24 caused by the stationary force of the carton acting upon the plunger jaw face 22 as the sliding jaw face 4 continues to advance with the control module 2 toward the carton.

Analysis of the foregoing will reveal that the whole number portion of the dimensional value of the distance being measured must be a function of the specific indexing slot 14-X that is engaged by the indexing ball catch 18 and that the decimal digit portion of such dimensional value must be a function of the position of the decimal plunger 20 within its plunger and spring housing 24 and the control module 2. Accordingly, to automatically "sense" the length of a carton having a value of, say, 16.3 inches or centimeters, and register/display such value in the electronic printing calculator 38, the sensing device should be interfaced with the length of the carton in consonance with procedures described in the preceding paragraph. Such interfacing will result in the indexing ball catch becoming engaged with indexing slot 14-16, while the spur gear 33 interfacing with the tens digit gear rack 30 will be straddled by gear teeth 30-0 and 30-1 and the spur gear 32 interfacing with the units digit gear rack 28 will be straddled by gear teeth 28-5 and 28-6; simultaneously, the plunger jaw face 22 and connecting decimal digit gear rack 26 will have receded 0.3 inches or centimeters toward/into the plunger and spring housing 24 and control module 2. In these positions, gear racks 30, 28 and 26 will have caused their interfacing spur gears 33, 32 and 31, respectively, and common shaft-mounted rotary contacts located inside the three rotary switches 36, 35 and 34, respectively, to be in electrical contact with output terminal contacts 36-1, 35-6 and 34-3, respectively. With power turned "on" in the calculator 38, if the index finger is used to "pull" the toggle switch 40 into the "on" position and the thumb "slides" the three digit slide switch 42 through its four terminals 42-1, 42-2, 42-3 and 42-4 into its "off" position adjacent to terminal 42-4, the calculator 38 will sequentially and electronically register a "1", a "6", a "decimal point" and a "3"; the monitor "window" in the calculator 38 will display the value "16.3". By releasing the spring-loaded "On-Off" toggle switch 40 to its normal "off" position, the spring-loaded three digit slide switch 42 can be released by the thumb to return to its normal "off" position adjacent to terminal 42-1 without causing an undesirable "reverse entry" of "3.61" being registered/displayed in the calculator 38. The value "16.3" will remain registered/displayed in the calculator 38 pending further processing as described hereunder. The foregoing illustrates that the tens digit gear rack 30 "senses" and causes entry of the "tens" digit "1" in the calculator 38; similarly, the units digit gear rack 28 and the decimal digit gear rack 26 "sense" and automatically register/display the values of the "units" and "decimal" digits "6" and "3", respectively, in the calculator 38.

To determine the surface area (square inches or square centimeters) of one surface of the carton associated with the 16.3 inches or centimeters, the toggle switch 40 is pulled into the "on" position and the multiplication keyboard button 44 is pressed. This operation will result in printing the value of the earlier dimension 16.3 on the paper tape of the printing calculator 38 and simultaneously will "program" the calculator 38 to anticipate the entry of a second value which is to be multiplied by 16.3. The second value is again "sensed" by interfacing the disclosed device with the second (rectangular) dimension of the carton to be measured and registering/displaying such value in the calculator 38 by duplicating procedures described above prior to the multiplication operation. With the toggle switch 40 in the "on" position and the "equals" keyboard button 48 depressed (rather than the multiplication keyboard button 44), the printing calculator 38 will print the value (for example) 10.0 on the line below the 16.3 entry and immediately/subsequently compute and print the product or area value 163.00 (square inches or square centimeters).

Similarly, if the cubic volume of a carton is desired, the foregoing described procedures will be amended as appropriate to provide for two value entries, each with a succeeding "multiplication" entry prior to a third value entry with a succeeding "equals" entry. The resultant of such process will be representative of cubic inches or cubic centimeters.

The "clear" keyboard button 50 is depressed with the toggle switch 40 in the "on" position to "clear" prior entries registered/displayed in the calculator 38. The "addition" keyboard button 46 may be used in lieu of the "multiplication" keyboard button 44 in order to add rather than multiply "sensed" dimensional values. This procedure is followed, for example, if the girth (perimeter of a carton measured around its two shorter sides) plus length of a carton is desired for determining whether or not a carton can be shipped within restrictions imposed by the U.S. Government Parcel Post Service or private parcel delivery.

Figure 7:
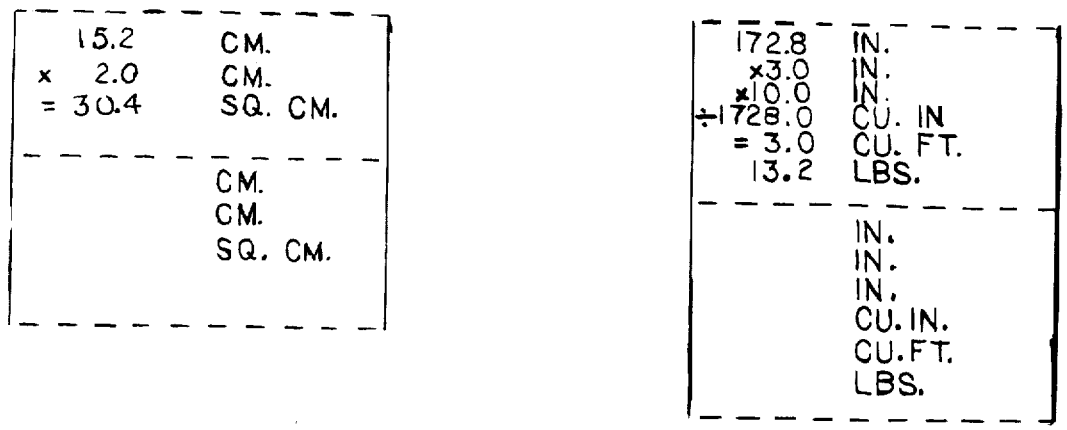
FIG. 7 illustrates typical label printouts from a standard printing electronic calculator or a programmable calculator or computer with associated printout capability.

Additional circuit control switches can be mounted on the control module 2 adjacent to the control handle 6 for "subtraction", "division", and other circuit control functions. For example, a four digit division slide switch 43 may be added and would include a terminal wired to the "division" keyboard button via contact 38-V on the calculator 38 followed by four terminals successively wired to the "1", "7", "2" and "8" digit keyboard buttons via contacts 38-1, 38-7, 38-2 and 38-8, respectively, on the calculator 38; "off" positions would be provided at both ends of slide switch 43 — see FIG. 3 for wiring diagram showing foregoing and how contacts on input side of slide switch 43 are shunted and wired to output terminal of "On-Off" switch 40. With this slide switch 43, the third dimensional entry associated with carton volume measurement/mensuration may be made and then immediately divided by the value 1728 to convert cubic inches automatically to cubic feet; thus the final value displayed and printed by the calculator 38 in a volume measurement/computation involving dimensions in inches would be expressed in terms of cubic feet (to the nearest thousandth); see FIG. 7. Similarly, such special slide switches are used to convert cubic centimeters to cubic meters, etc., etc.

Figure 4:
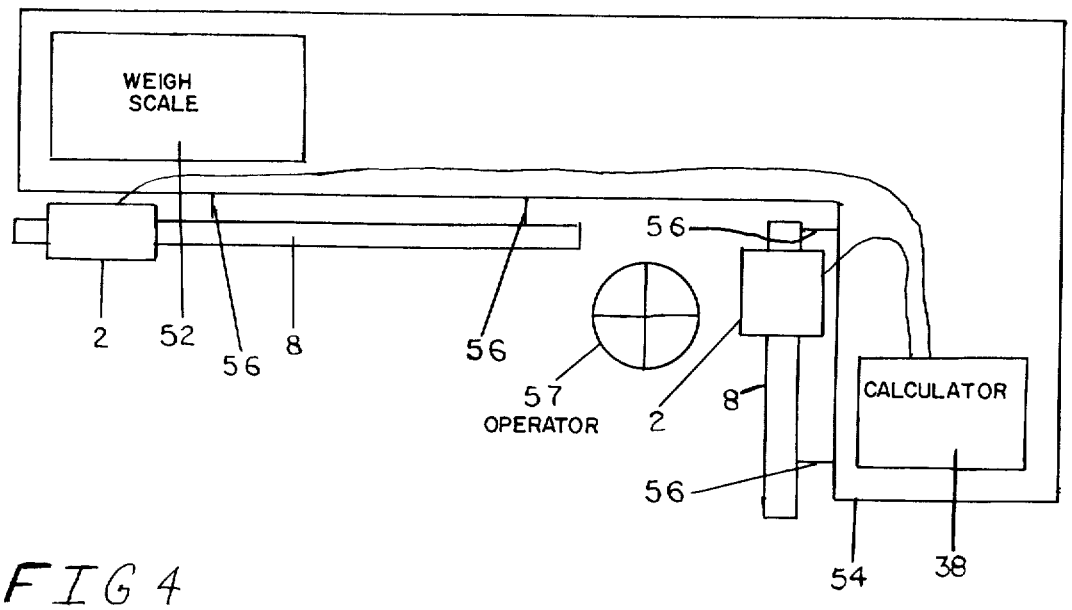
FIG. 4 is a plan view illustrating the use of two manually operated automatic sensing caliper devices and a weighing scale at a workstation.

FIG. 4 is a plan view that illustrates a sample workstation with weigh scale 52 and printing calculator 38 mounted on an L-shaped worktable 54; a pair of dimensional sensing devices disclosed above are wired in parallel with each other and with the contact switches under keyboard buttons of the calculator 38. When not in use, the dimensional sensing devices are suspended on holding hooks 56 mounted along the edges of the worktable 54 adjacent to the operator 57. The shorter device is used for measuring relatively short dimensions while the longer device is used for measuring longer dimensions. Either of the two devices may be used for taking any particular measurement and automatically registering/displaying/mensurating/printing it in the calculator 38. The procedures described in prior paragraphs for operation of a single measurement sensing device are applicable when two (or more) such devices are electrically connected in parallel (as described above) except that either (any) of the devices can be used in determining any linear dimension required in the measurement/mensuration process and transmitting sensed dimensional data to the calculator 38. The sample workstation illustrated in FIG. 4 has application in a small post office or shipping/receiving department. Weight values for objects weighed on scale 52 are visually observed by the operator 57 and such values are manually inserted directly into the keyboard of the calculator 38 for label printouts exemplified by FIG. 7. Alternately, weight data entries into the calculator 38 can be automated by using weighing procedures and associated equipment described below in the procedures relating to FIG. 6.

Figure 5:
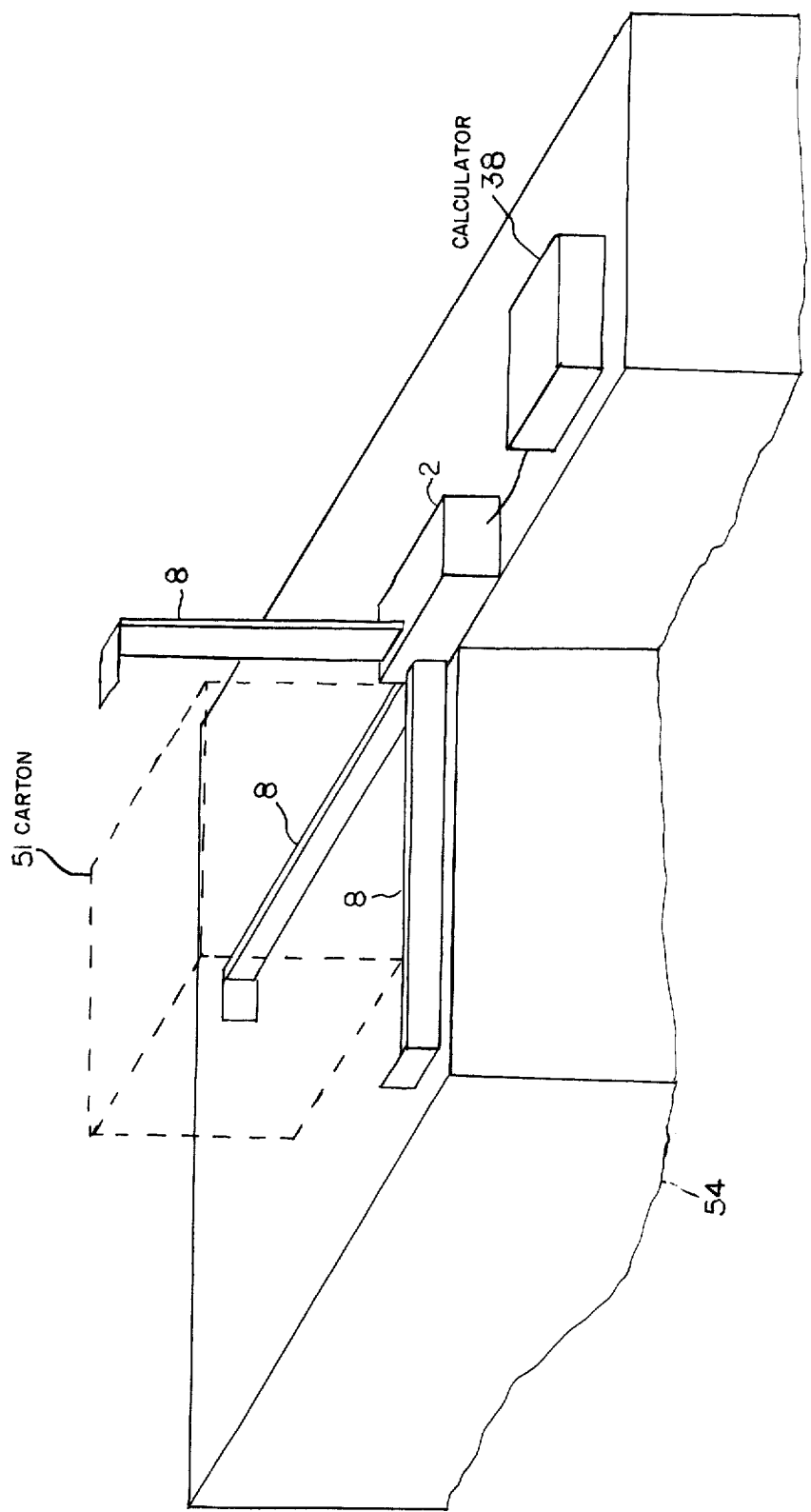
FIG. 5 is a view in perspective of a possible configuration consisting of three manually operated automatic sensing caliper devices (mounted with one each in the x, the y and the z axes) at a weighing scale workstation.

FIG. 5 illustrates a modification of a portion of FIG. 4 wherein three sensing devices are substituted for the pair of dimensional sensing devices illustrated in FIG. 4. The three sensing devices are mounted at right angles to one another as if they were the x, y and z axes of a geometrical coordinate system. Measurements are sensed by positioning a corner of the object to be measured, as for example a carton 51, against the origin point of the three measurement sensing devices and sliding the three control modules 2 on their respective sensing bars 8 and subsequently taking and transmitting/printing measurements in consonance with procedures described above for FIG. 4.

Figure 6:
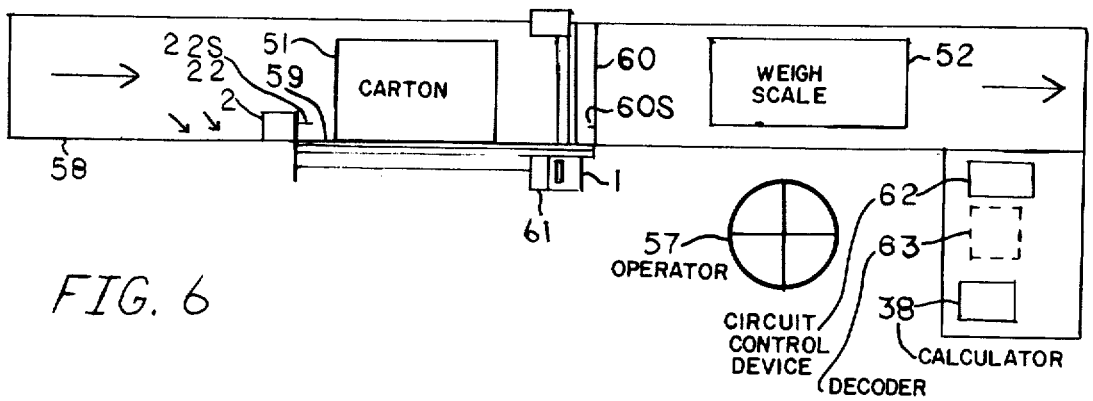
FIG. 6 is a plan view that represents a modification of the apparatus in FIG. 5 that depicts three fully automated sensing devices mounted at a powered conveyor weighing station.

FIG. 6 is a plan view that illustrates three measurement sensing devices mounted at right angles to one another as in FIG. 5 that are attached to the downstream end of a powered skewed conveyor 58. The conveyor 58 is equipped with an alignment fence 59 and retractable stop 60. The conveyor 58 receives at its upstream end an object to be measured, hereinafter referred to as a carton 51; it automatically moves the carton 51 along its alignment fence 59 so that one vertical plane surface of the carton 51 is parallel with and in contact with a long vertical contact face on the alignment fence 59. The conveyor 58 moves the carton 51 along the alignment fence 59 until the carton 51 depresses the pushbutton electrical switch 60S located in the vertical (carton contact) face on the upstream side of the retractable stop 60. The pushbutton electrical switch 60S (or other type sensing device of known design mounted on or adjacent to the retractable stop 60) actuates an electrical control circuit (or alternately, a pneumatic, hydraulic or other type control circuit) that causes three pneumatic or other type power feed mechanisms 61 (or other type feed mechanisms of known design) to commence automatic measurement sensing operations by the three measurement sensing devices that are mounted at right angles to one another. A circuit control device 62 is positioned in the control circuit between the electrical switch 60S and the power feed mechanisms 61 in order to properly cycle; the circuit control device 62 may comprise any one of several commercially available sequential programming devices; e.g., see U.S. Military Specification 3786/18V Switch, Rotary, Electro-Mechanical Actuated (Solenoid Type), Open Construction, ½ ampere, Style SR18, as manufactured, for example, by Oak Industries, Switch Division, Crystal Lake, Ill.

For simplicity in illustrating measurement sensing operations, only one of the three measurement sensing devices in FIG. 6 identifies detailed component assemblies/parts involved in procedures described in the following paragraph; the other two measurement sensing devices are simply identified with the numerical designation "1". However, it is to be understood that the procedures described in the following paragraph apply to all three linear measurement sensing devices.

The circuit control device 62 causes the three separate power feed mechanisms 61 to automatically move the three control modules 2 on their respective sensor bars 8 so as to move the three control module jaw faces 4 and the three plunger jaw faces 22 (See FIG. 1) toward the carton 51. On each of the three measurement sensing devices, a pushbutton electrical switch 22S is mounted in the plunger jaw face 22; also, a micro-switch 18S is mechanically mounted adjacent to the ball catch 18 (see FIG. 1) and is actuated when the ball catch 18 engages any of the indexing slots 14 (see FIG. 1) on the measurement sensing device. The switches 22S and 18S are wired in series with a control circuit commencing and ending in the circuit control device 62. As the power feed mechanism 61 advances the plunger jaw face 22 toward the carton 51, it will ultimately cause the pushbutton electrical switch 22S to be depressed by the carton 51; at that same instant or subsequently, due to continuing movement of the control module 2 toward the carton 51, the indexing ball catch 18 will engage an indexing slot 14 (see FIG. 1) at which instant the microswitch 18S will be actuated; the pushbutton electrical switch 22S and microswitch 18S are wired (in series as described above) so that when they are both thus actuated at the same time, they will "close" an electrical control circuit that will cause other control switching capability within the circuit control device 62 to stop the power feed mechanism 61 from advancing any further. Subsequently, circuit control capability within the circuit control device 62 will cause dimensional data, sensed by the dimensional device, to be transmitted, mensurated and printed in the calculator 38.

The circuit control device 62 is programmed to sequence sensed measurement data from each of the three measurement sensing devices into the calculator 38 and cause subsequent mensuration and printouts therein; it will subsequently cause the power feed mechanism 61 to retract each control module 2 from having contact with the carton 51 and will cause their return to normal (manually or automatically preset) positions awaiting arrival of the next carton 51 on the conveyor 58.

The procedures and equipment described in the foregoing provide for the elimination of manual circuit control switches 40 through 50 in the three control modules 2 and placement of automatic circuit control switching capability in the circuit control device 62. Also, procedures outlined in the foregoing represent only one method for automating the linear measurement sensing device disclosed and depicted in FIGS. 1 and 2; alternatives to the methods outlined above include sensing/switching capabilities other than those depicted and described for switches 60S, 22S and 18S; such alternatives may include any of the known devices and systems for attaining the same results.

Subsequent to measurement sensing by all three measurement sensing devices in accordance with the foregoing procedures relating to FIG. 6, the circuit control device 62 is programmed to actuate a solenoid, pneumatic cylinder or other linear motion device of known design to cause the retractable stop 60 to automatically be lowered to a level below the horizontal plane of the top rolling surface of the conveyor 58 so that the carton 51 is free to be moved by the powered conveyor 58 onto the adjacent weigh scale 52 whose top surface consists of non-powered rollers. When the carton 51 completely passes to the downstream side of the retractable stop 60, a microswitch or other sensing device (not illustrated) of known design positioned on the downstream side of the retractable stop 60 senses such passing and signals such information to the circuit control device 62. Upon receiving such signal, the circuit control device 62 causes the retractable stop 60 to be automatically raised to its uppermost position by its associated vertical movement device (not illustrated) which positions it to stop the next carton 51 moving downstream onto and across conveyor 58.

The operator 57 can subsequently observe the weight valve visually displayed by the weigh scale 52 and manually enter it directly in the keyboard of the calculator 38 in accordance with procedures previously outlined in connection with FIG. 4. Alternately, automatic weighing can be accomplished by electrically/electronically connecting a decoder 63 (e.g., Wang Micro-Interface Decoder, Model Series 605 by Wang Laboratories, Incorporated, Tewksbury, Mass.) between an electronic weigh scale 52 of known design (e.g., Toledo Scale Co. Weigh Scale with Digital Indicator, Model 2184 with 24 by 30 inch platform containing rollers) which in turn transmits numeric weight values to the calculator 38 for printout of dimensional, cube and weight data in consonance with printout formats exemplified by FIG. 7. If a programmable calculator or computer with associated printout capability is substituted for the standard printing calculator 38, densities can automatically be computed by dividing weight values by cube values and printing resultant density values in terms of weight per unit of cubic measure. Similarly, using such programmable calculator or computer, the dimensions, cube, weight and density of an individual carton or group of cartons can be processed further in unlimited variations to provide for optimum use of integrated data.

The operator 57 can tear off pre-perforated labels (see perforated broken lines on sample labels illustrated in FIG. 7) from the standard printing calculator 38 or printout device associated with a programmable calculator or computer, and apply such labels (gummed-backed or pressure-sensitive-backed) directly to the carton 51 during a manual process that might include visual inspection of cartons, material contained in cartons, processing of associated documents, keypunching carton/material information through a computer remote keyboard, etc., etc.

The programmable calculator or computer described above can be used for transmitting data to other computers; for preparation of punched cards, punched tapes, magnetic tapes, etc.; for determining freight rates, optimum transportation, warehousing or production modes; for determining optimum cargo loads, centers of gravity, etc., etc.

Any of the several known sensing methods may be substituted for the dimensional sensing method described above. For example, gear racks 28 and 30 may be made identical to gear rack 26 (i.e. 10 teeth per inch or centimeter) if the interfacing spur gears 32 and 33 drive a (reduction) gear train whose final driven shaft is coupled with the associated rotary switches 35 and 36. Alternately, any other mechanical sensing device or, any other type of sensing device, whether chemical, optical, thermal, electrical, acoustical, or otherwise may be substituted. Such substitutions may open and close binary electrical control circuits in a manner similar or identical to the manner described for the device above disclosed; or, they may transmit coded digital signals to a decoder located between the device and the printing calculator, programmable calculator or computer receiving such transmissions.

An example of a programmable calculator capable of receiving uncoded or coded dimensional signals and/or coded weight signals is a Wang 600 Series Programmable Calculator (e.g., Model 600-2-T-P with cassette programming and memory capability) receiving coded signals via a decoder such as a Wang Micro-Interface Decoder (e.g. 605-1 A) manufactured by Wang Laboratories, Inc., Tewksbury, Mass. Examples of the aforementioned several known sensing methods that may be substituted for the dimensional sensing methods described above, including chemical, optical, thermal, electrical, acoustical, magnetic, or otherwise, are described in publications available to the general public such as: U.S. Military Standard 1132 on "Switches and Associated Hardware, Selection and Use of", Honeywell, Inc., Microswitch Division Catalog 84–27015 on photoelectric and proximity devices, also Product Sheet SS on solid state magnetic devices; General Electric Co. Publication 55.01 on opto-electronic devices including photocouplers; U.S. Military Specification 81321 on "Encoder, Shaft Angle"; U.S. Military Specification 81050 on "Encoder, Shaft Position"; such sensing devices may be substituted for the sensor actuator 76 (gear rack), sensor C32 (spur gear) and/or sensor switch 78 (mechanical read-out counter) described for and illustrated in FIG. 10; when such devices generate a coded dimensional signal, a decoder 74 of known design (e.g., Wang Series 605-type Micro Interface Decoder) should be added to the conductor means connecting such devices to the calculator 38 as illustrated in FIG. 10 (see broken lines).

Figure 8:
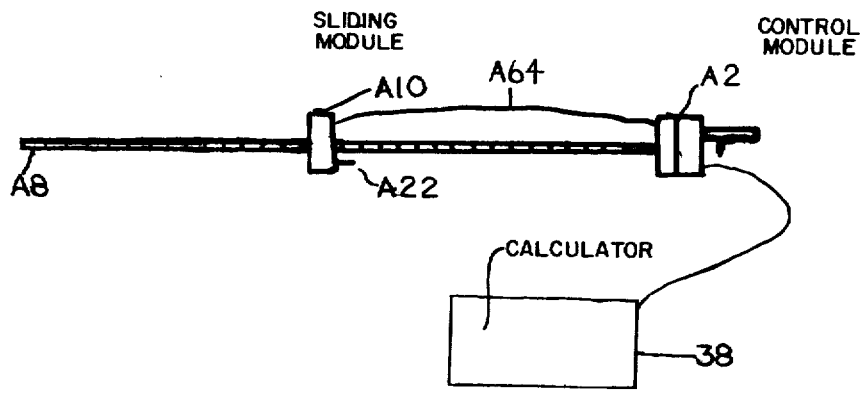
FIG. 8 is a side elevation view of one alternative design for the device illustrated in FIG. 1 that relocates the decimal plunger jaw and some circuit control switches to the L-shaped sensor bar from the control module.

FIG. 8 illustrates yet another alternative wherein the sensor bar A8 is permanently affixed to a control module A2, and a plunger jaw A22 is mounted in/on a sliding module A10; in this configuration, dimensional sensing capability is contained in the sliding module A10 (rather than in module A2) and circuit control capability is housed in both the control module A2 and the sliding module A10; also, some electrical circuitry is contained in the harness A64, or alternately, such circuitry is incorporated within the sensor bar A8 as printed circuitry.

Figure 9:
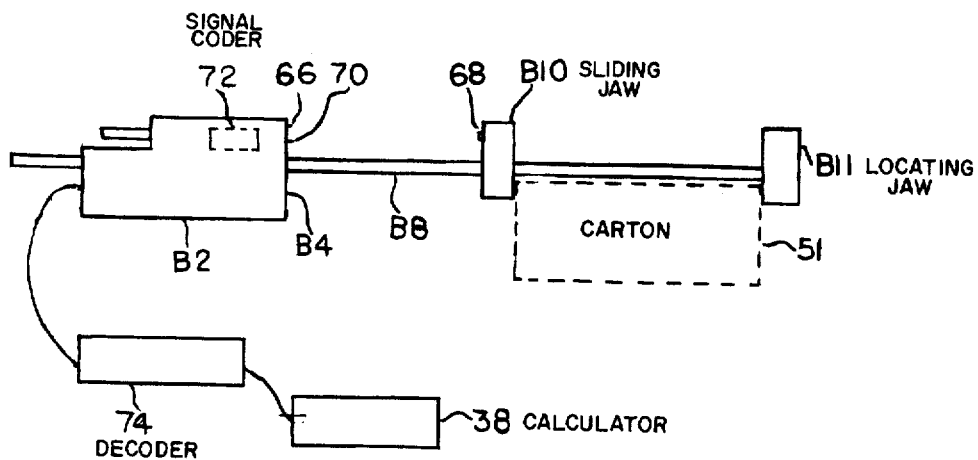
FIG. 9 is a side elevation view of a second alternative caliper design that utilizes an "echo" principle for dimensional sensing.

Still another alternative is illustrated by FIG. 9 wherein a transmitter 66 located in the control module B2 beams a frequency signal, including radar, photoelectric, sonar, etc., at a retroreflector 68 located on the sliding jaw B10; in some applications the sliding jaw B10 and the retroreflector 68 will not be required if objects to be measured can function as retroreflectors; a receiver 70, also located in the control module B2, receives the reflected "echo" or wave and a signal coder 72 located in the control module B2 transmits received signals to a decoder/interpretor 74 that interprets the length measured (by computing time-delay) and transmits such data to the calculator 38. Note that in this method the carton 52 is positioned between the sliding jaw B10 and a locating jaw B11. The distance between locating jaw B11 and the control module B2 is a fixed distance. Therefore, the distance between the control jaw B4 and sliding jaw B10 must be automatically subtracted by the calculator 38 from the fixed distance between control jaw B4 and locating jaw B11 in order to determine the dimension of the object being measured. This "differential" method of measuring may also be applied to the other methods disclosed herein. Conversely, the "non-differential" measuring method utilized by the other methods may be used by the device illustrated in FIG. 9 by relocating the object being measured so that it may be embraced by jaws B4 and B10.

Figure 10:
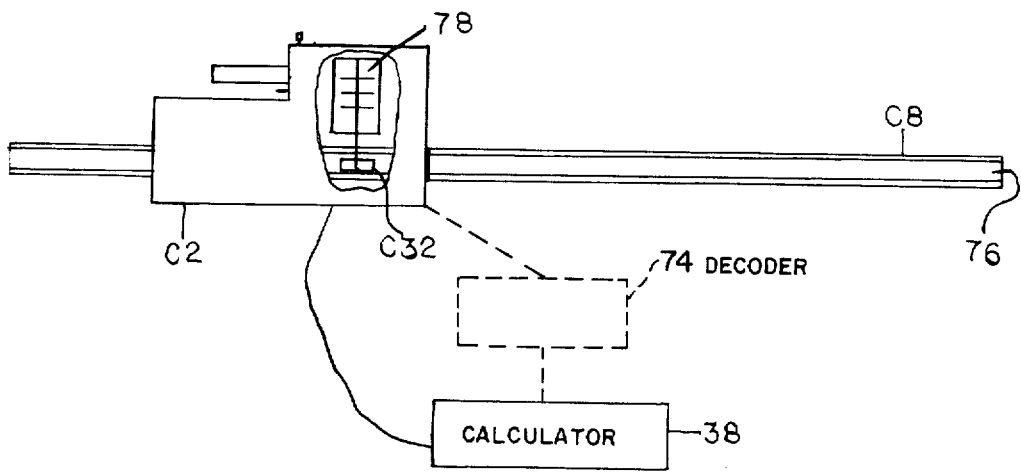
FIG. 10 is a side elevation view of a third alternative design for the device depicted in FIG. 1 may use any one of the known sensor actuators and sensors/switches to sense a dimension and transmit noncoded dimensional signals to a calculator or coded dimensional signals via a decoder to a calculator.

Yet another alternative is exemplified by FIG. 10 which illustrates the use of a single gear rack 76 running the length of sensor bar C8; the gear rack 76 consists of 10 gear teeth per inch or centimeter and is used to drive a ten tooth spur gear C32 that has a pitch circumference of 1.00 inch or centimeter. Thus a linear movement of 1.00 inch or centimeter by the sensor bar C8 and gear rack 76 causes the interfacing spur gear C32 to revolve exactly 360°. By mounting the spur gear C32 on a common shaft with the "drive" wheel of a modified (reversible) standard three wafer mechanical readout counter 78 (of known design) in the control module C2, the three (ten-position rotary electric switches) wafers function exactly as the three rotary switches 34, 35 and 36 depicted in FIGS. 1, 2 and 3. Alternately, magnetic sensor actuators and a decade electric counter can be substituted for the gear rack 76, spur gear C32 and mechanical readout counter 78.

Figure 3:
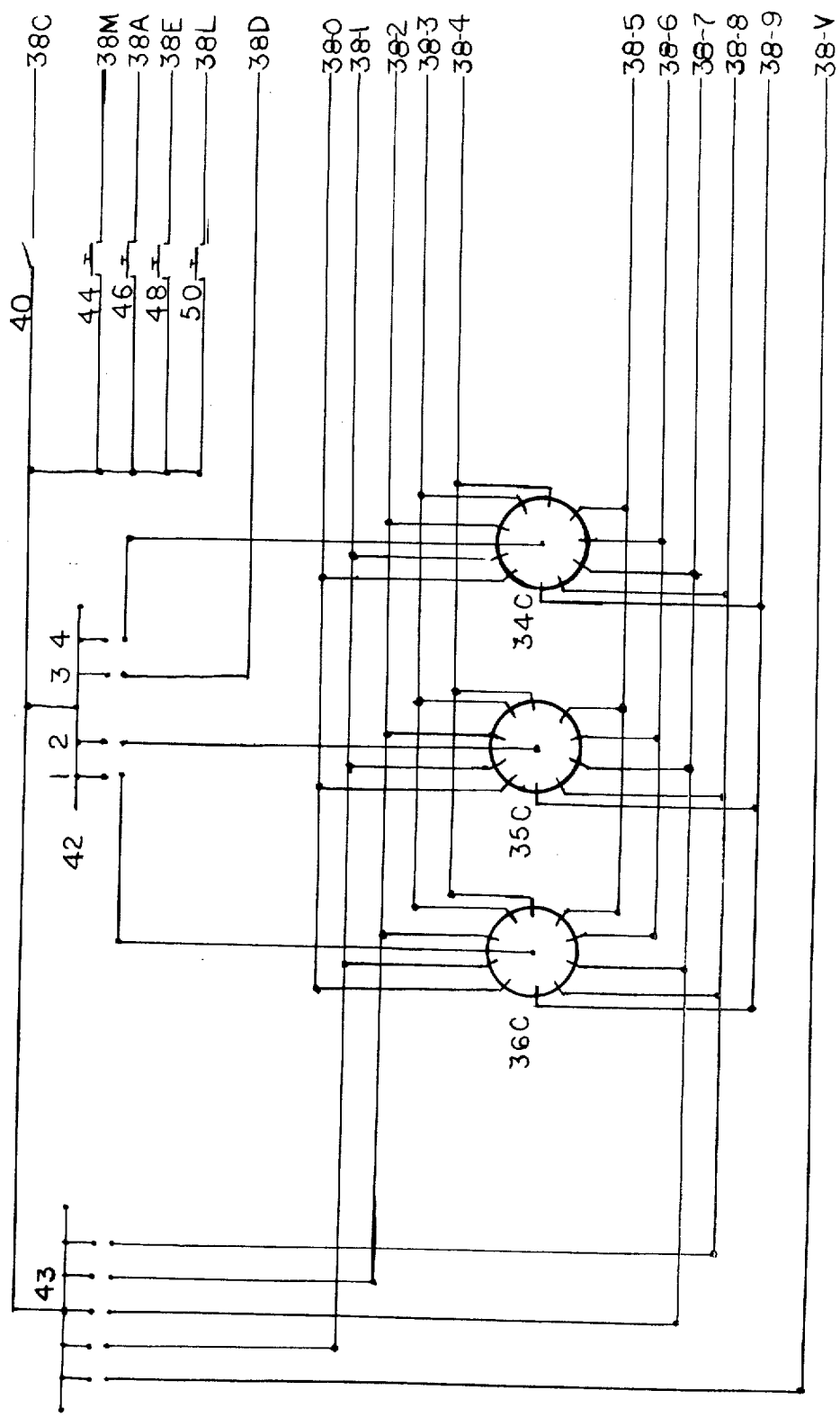
FIG. 3 is a schematic wiring diagram for the devices depicted in FIGS. 1, 2, 8 and 10.

Analysis of the foregoing will reveal that the wiring diagram illustrated in FIG. 3 is applicable to the device disclosed in FIGS. 1 and 2 and alternatives thereto exemplified by illustrations in FIGS. 8 and 10. Also, it will be noted that the indexing notches 14, ball catch 18, gear racks 26, 28 and 30, spur gears 31, 32 and 33, rotary switches 34, 35 and 36 and decimal plunger components 20, 22 and 24 of FIGS. 1 and 2 are not required for the alternatives exemplified by FIGS. 9 and 10.

If these components are also deleted from the device disclosed and exemplified by FIG. 8, and if the mechanical readout counter 74 and gear rack 76 are deleted from the device exemplified by FIG. 10, and if such components are replaced with appropriate switch actuators disposed along the length of sensor bars A8 and C8, and if such sensor switch actuators are operatively coupled to sensing switches that are wired to signal decoders wherein such switches and decoders are contained in control modules A2 and C2, the devices disclosed and exemplified by FIGS. 8 and 10 can be modified to generate coded electrical signals that are representative of sensed dimensions and to decode and transmit such sensed dimensions as non-coded dimensional signals directly to the calculator 38 for registration, mensuration and printout in consonance with the above teachings. Such decoded sensed dimensional values are similarly transferred and processed via the output signals of the decoder/interpretor 74 wired to the calculator 38 by the device depicted in FIG. 9. The wiring diagram of FIG. 3 can be made applicable to such coded/decoded signals representative of sensed dimensions if the slide switch 42 in FIG. 3 is replaced with a single-pole, single-throw sensor actuated switch and if the rotary switches 34, 35 and 36 are replaced by a decoder. Similar modifications to the device exemplified by FIGS. 1 and 2 would also result in such device being capable of initiating coded dimensional signal and decoding such signals for direct input to the calculator 38 in accordance with the above teachings.

Any of the three alternative caliper-type measurement sensing devices exemplified by FIGS. 8, 9 and 10 and variations thereof may be assembled in any combination of configurations such as those portrayed by FIGS. 4, 5 and 6. The caliper-type dimensional sensing devices with inherent mensuration and label printout capabilities described above may be used simply for determining linear dimensions. Alternately, they may be utilized in determining areas or volumes of regular geometric plane surfaces or three dimensional objects; in more complicated instances, dimensional sensing may be combined with reference to geometric formulae to enhance accurate and efficient mensuration computation. Applications may be manual, semiautomatic or fully automatic with complete integration with other data, outputs from electronic weighing scales, etc. Potential uses will be found throughout business, industry, and government.

Obviously, many modifications and variations of the present invention are possible in light of the above teachings. It is therefore to be understood that within the scope of the appended claims the invention may be practiced otherwise than as specifically described.

What is claimed is:

1. A device for conveniently determining and displaying the dimensions, girth, surface areas, and volume of a regularly shaped object by mensuration of a second dimension and the application of a mathematical function to the sensed dimension and a subsequently sensed dimension comprising:

means for sensing dimension of an object and for providing an electrical signal representative thereof, said means for sensing a dimension consisting of at least one sensor bar having at least one sensor actuator disposed along its length and a jaw face normal to said sensor bar at one end, a sensing module having a slide tunnel for slidably receiving said sensor bar and a jaw face parallel to and facing said sensor bar jaw face, at least one dimension sensing switch disposed in said sensing module and operatively coupled to said sensor bar and said sensor actuator so that the action of said sensing switch is representative of the measured dimension and not more than one spring loaded decimal plunger rod extending from said sensing module jaw face normal thereto having at least one sensor actuator disposed along its length and operatively connected to at least one said dimension sensing switch disposed in said sensing module;

an electronic keyboard calculator;

conductor means for connecting said sensing and signal providing means electrically in parallel with the keyboard of said calculator; and, control switch means for selectively transmitting said signal along said conductor means to said calculator, whereby said dimension is registered in said calculator.

2. The device of claim 1 wherein said sensing means comprise mechanical devices.

3. The device of claim 2 wherein said mechanical sensing devices comprise:

at least one set of a plurality of equally spaced gear teeth disposed along said sensor bar and a separate set of gear teeth disposed along said decimal plunger rod;

at least one said mechanical sensing switch consisting of a spur gear having its teeth contacting said sensor bar gear teeth and mounted on the shaft of a ten position rotary switch whereby the position of the switch is determined by the position of said sensor bar and is representative of the whole number portion of a measured dimension; and, not more than one said mechanical sensing switch consisting of said spur gear containing said decimal plunger rod gear teeth and mounted on the shaft of a ten position rotary switch whereby the position of the switch is determined by the position of said decimal plunger rod and is representative of the decimal portion of said measured dimension.

4. The device of claim 3 wherein said sensor bar has regularly spaced index slots disposed along its length, the distance between said index slots being related to the distance between said sensor bar gear teeth; and, said sensing module includes means for releasably engaging said slots when any one of a plurarity of predetermined distances exists between said sensing module jaw face and said sensor bar jaw face.

5. The device of claim 4 wherein said decimal plunger rod extends from said sensing module jaw face a predetermined distance slightly less than the distance between said index slots when fully extending whereby the distance between the face of the fully extended rod and the sensor bar jaw face is one of a second plurality of predetermined distances when one of said slots is engaged by said engagement means.

6. The device of claim 5 wherein:

the distance between said slots is a whole number; and, each of said second plurality predetermined distances is a whole number, whereby the distance that the decimal plunger rod extends from said sensing module jaw face during a dimension measurement indicates the decimal portion of said measurement.

7. The device of claim 1 wherein said sensing means comprise magnetic devices.

8. The device of claim 2 wherein said mechanical sensing devices comprise:

at least one said sensor actuator consisting of equally spaced gear teeth disposed along the said sensor bar; and, a said sensing switch consisting of a spur gear having its teeth contacting said sensor bar gear teeth and mounted on the shaft of a mechanical readout counter having a plurality of ten position switches whereby the position of said rotary switches is determined by the position of said sensor bar and said switch positions are representative of a measured dimension.

9. The device of claim 7 wherein said magnetic sensing devices comprise:

at least one said sensor actuator consisting of equally spaced permanent magnets disposed along the said sensor bar; and, at least one magnet sensing switch operatively connected to an electric decade counter having a plurality of ten position rotary switches that are caused to rotate by the action of said magnet sensing switch whereby the positions of said ten position switches are determined by the position of the said sensor bar and said rotary switch positions are representative of a measured dimension.

10. The device of claim 1 wherein said sensing means comprise photo-electric devices.

11. The device of claim 1 wherein said sensing means comprise electrical devices.

12. The device of claim 1 wherein said sensing means further comprise a pulse generator, said pulse generator comprising:

a plurality of equally spaced sensor actuators disposed along said sensor bar; and, at least one said dimension sensing switch caused to open and close by the said sensor actuators and initiating and transmitting coded electrical signals representative of sensed dimensions to a decoder which in turn transmits dimensional values as non-coded electrical signals representative of single digit numbers 0 through 9 over at least ten conductors to non-common terminals of contact switches of corresponding numeric keyboard buttons of said calculator.

13. The device of claim 1 wherein said sensor bar and said decimal plunger rod further comprise said conductor means and related conductor terminal contacts within and along their respective lengths.

14. The device of claim 1, wherein three sensor bars are disposed so that each bar is normal to the other two and adjacent each other so that their jaw faces can all contact the object to be measured simultaneously.

15. The device of claim 1 further including:
means for automatically positioning the object adjacent said sensor bar; and,
automatic control means for causing sliding motion between said sensor bar and said sensing module such that the two jaw faces close toward each other with the object between them, and for stopping said motion when said sensor bar is positioned relative to said sensing module such that a dimension is sensed.

16. The device of claim 1 wherein three sensor bars are disposed so that each bar is normal to the other two, and further including:
means for automatically positioning the object adjacent said sensor bars; and,
automatic control means for causing sliding motion between each sensor bar and its associated sensing module such that the jaw faces close toward each other with the object between them, and for stopping said motion when said sensor bars are positioned relative to said sensing modules such that a dimension is sensed.

17. A device for conveniently determining and displaying the dimensions, girth, surface areas and volume of a regularly shaped object by mensuration of a sensed dimension and the application of a mathematical function to the sensed dimension and a subsequently sensed dimension comprising:
means for sensing a dimension of an object and for providing an electrical signal representative thereof,
said means consisting of a bar having a jaw face at one end, a slidable jaw having a first face parallel to and facing said bar jaw face and a tunnel therein adapted to receive said bar and slidable thereon, an energy reflective surface disposed on a second face of said slideable jaw, means for transmitting energy towards said reflective surface, means for receiving energy reflected from said reflective surface and for generating coded signals representing the distance between said transmitter and said reflective surface and means for decoding said coded signals in a decoder;
an electronic keyboard calculator;
conductor means for connecting said decoder, said sensing and signal providing means electrically in parallel with the keyboard of said calculator whereby said decoder transmits sensed dimensional values as non-coded electrical signals representative of single digit numbers 0 through 9 over at least ten electrical conductor paths to the non-common terminals of contact switches of corresponding numeric keyboard buttons of said calculator; and
control switch means for selectively transmitting said signal along said conductor means to said calculator, whereby said dimension is registered in said calculator.

18. The device of claim 17, wherein said transmitting and receiving means are acoustical devices.

19. The device of claim 17 wherein said transmitting and receiving means are microwave devices.

20. The device of claim 17 wherein said transmitting and receiving means are photoelectric devices.

21. The device of claim 17 further including:
means for automatically positioning the object adjacent said bar; and,
automatic control means for sliding said slidable jaw toward said bar jaw face with the object between them, and for stopping the slidable jaw when both jaws are in contact with the object.

22. A device for conveniently determining and displaying the dimensions, girth, surface areas and volume of a regularly shaped object by mensuration of a sensed dimension and the application of a mathematical function to the sensed dimension and a subsequently sensed dimension comprising:
means for sensing a dimension of an object, including at least one dimension sensing switch, and for providing an electrical signal representative thereof;
mathematical function switch means for applying mathematical functions to sensed dimensions and for providing an electrical signal representative thereof;
an electronic keyboard calculator, said keyboard consisting of at least ten numeric, one decimal and several mathematical function keyboard buttons for manual operation of said calculator with each said keyboard button operatively coupled to a normally open two-position electrical contact switch comprising a non-common contact and terminal and a powered common contact and terminal that is commonly shared by all other said contact switches of said keyboard buttons of said calculator;
conductor means including means for connecting said dimensional sensing and mathematical function switch signal providing means electrically in parallel with said electrical contact switches of corresponding numeric, decimal and mathematical function keyboard buttons of said calculator; and
signal control and control switch means that include a normally open two-position On-Off switch having its input terminal connected to the said powered common contact and terminal of said contact switches of said keyboard buttons of said calculator, for selectively receiving said signals and sequentially transmitting noncoded digital signals over selected portions of said conductor means to said non-common contacts and terminals of said contact switches of said keyboard buttons of said calculator whereby said calculator registers said dimensions, girth, surface areas and volume of said object under control of said device.

23. The device of claim 22 wherein said signal control means comprises at least one multi-position slidable contact switch having its common input terminal connected to the output terminal of said two-position On-Off control switch and having at least one of its output terminals connected to the input terminal of at least one said dimension sensing switch and not more than one of its output terminals connected to the non-common terminal of said contact switch of said decimal keyboard button of said calculator.

24. The device of claim 23 wherein said dimension sensing switch means comprise multiples of ten-position switch means that normally include at least one ten-position rotary switch wherein the ten output terminals of said ten-position switch are sequentially designated with single digit numeric values of 0 through 9 and appropriately connected to the said non-common terminal of said contact switches of their corresponding value numeric keyboard buttons of said calculator.

25. The device of claim 22 wherein said mathematical function switch means comprises at least one normally open multi-position switch that is normally a two position switch having its input terminal connected to the output terminal of said "On-Off" control switch and its output terminal connected to the non-common terminal of said contact switch of the corresponding mathematical function keyboard button of said calculator.

26. The device of claim 22 wherein said dimension sensing and signal comtrol means comprise:
at least one dimension sensing switch whose input terminal is connected to the output terminal of said On-Off control switch wherein said dimension sensing switch functions as a pulse generator that initiates a coded dimensional signal; and
signal control means that incorporates an electric signal decoder having at least one input terminal that is connected to the output terminal of said dimension sensing switch and further having at least ten output terminals that are sequentially designated with a single digit numeric value of 0 through 9 and connected to the said non-common terminals of the said contact switches of their corresponding numeric value keyboard buttons of said calculator; whereby the said dimension sensing switch initiates and transmits coded dimensional signals to the said decoder which comprises decoding means for providing non-coded said dimensional signals, including decimal signals, to said calculator.

27. The device of claim 22 further including:
a weighing scale located in the vicinity of said dimension sensing means for weighing said object and initiating a coded electrical signal representative thereof;
a decoder wherein said coded electrical signal is decoded and transmitted as non-coded electrical digital signals over multiple conductor means to said non-common contacts of said contact switches of said numeric and decimal keyboard buttons of said calculator; and
a control module including conductor and control means for receiving power from said powered common terminal and contact of said contact switches of said keyboard buttons of said calculator and returning said power as non-coded electrical signals to said calculator via said scale and said decoder in a sequenced and controlled manner that provides for the input of said weight signals to said calculator whereby the density of a weighed and dimensionally sensed volume computed object can be determined by utilizing said mathematical function switches as appropriate and said density and said weight can be registered, displayed, and otherwise processed.

* * * * *